United States Patent

[11] 3,558,926

[72] Inventor Charles A. Kappenman
Wheaton, Ill.
[21] Appl. No. 680,261
[22] Filed Nov. 2, 1967
[45] Patented Jan. 26, 1971
[73] Assignee Bell Telephone Laboratories Incorporated
Murray Hill, N.J.
a corporation of New York

[54] CIRCUIT FOR PROVIDING A PULSE A FIXED TIME AFTER A PREDETERMINED PER CENT COMPLETION OF AN APPLIED PULSE

2 Claims, 3 Drawing Figs.

[52] U.S. Cl. .... 307/263, 307/228; 328/185; 307/293
[51] Int. Cl. .... H03k 6/04
[50] Field of Search .... 307/228, 263, 290; 328/185

[56] References Cited

UNITED STATES PATENTS

| | | | |
|---|---|---|---|
| 3,227,891 | 1/1966 | Ashcraft | 328/185 |
| 3,363,187 | 1/1968 | Hickin | 328/108 |
| 3,364,366 | 1/1968 | Dryden | 307/228 |

*Primary Examiner*—Donald D. Forrer
*Assistant Examiner*—R. C. Woodbridge
*Attorneys*—R. J. Guenther and Kenneth B. Hamlin

ABSTRACT: A sampling pulse generating circuit in which a waveform rising at a first rate during the presence of an input pulse is modified to rise at a second rate thereafter. When the waveform achieves a fixed value the sampling pulse is generated.

PATENTED JAN 26 1971 3,558,926

INVENTOR
C. A. KAPPENMAN
BY
J. P. Kearns
ATTORNEY

CIRCUIT FOR PROVIDING A PULSE A FIXED TIME AFTER A PREDETERMINED PER CENT COMPLETION OF AN APPLIED PULSE

FIELD OF THE INVENTION

This invention relates to a pulse generating circuit and particularly to a circuit for providing a pulse a fixed time after a predetermined percent completion of an applied pulse.

BACKGROUND OF THE INVENTION

To convert information represented by a plurality of parallel synchronized pulses into convenient form, it is often necessary to sample each of the synchronized pulses once during each output pulse period.

When the synchronized pulses are supplied by a plurality of transducers, such as are included in a magnetic tape reading head, a sampling pulse is derived after the sync pulses are sliced or level detected. The sliced pulses have each a pulse width which is a function of each synchronized pulse amplitude. As a result, the leading edge of the various sliced pulses may not occur at the same instant of time. It, therefore, is not advantageous to use the leading edge of one of these pulses to generate the sampling pulse.

In some systems an automatic gain control circuit is included in each of the synchronized pulse channels. In other systems, the slicing levels of the slicers are adaptively adjusted. These systems control the average amplitude of each series of synchronized pulses but do not remove the pulse-to-pulse variations and therefore sampling pulse jitter is inherent in systems of this nature.

It should be appreciated that the widening of the output pulses by a slicer due to synchronized pulse amplitude variations is relatively symmetrical if a low hysteresis slicer is employed. Therefore, the center of each of the synchronized pulses will occur within a smaller time interval than will the leading or trailing edges of the same pulses. A sampling signal generated at a time related to the center of one of the synchronized output pulses therefore will jitter less with respect to the center of the synchronized pulses than will a sampling signal generated with respect to an edge thereof.

One approach to generating a pulse related to the center of a synchronized pulse is to differentiate the synchronized pulse and detect the zero crossing of the differentiated signal. This system will work only if the synchronized pulse has zero slope at its center. Further, differentiation of a signal tends to accentuate high-frequency noise. It has been found that the noise so introduced in a multitrack tape system is sufficient to render such a system commercially unattractive.

BRIEF DESCRIPTION OF THE INVENTION

In order to generate a sampling pulse a fixed time after a predetermined percent completion of an applied pulse, a linearly rising waveform is required during the duration of the applied pulse. At the termination of the applied pulse the waveform is modified to rise at a rate greater than the original rate of rise. When the waveform reaches a predetermined amplitude, the sampling pulse is generated.

To assure that the sampling pulse is a fixed time after the center of the applied pulse, the modified rate of rise should be twice the initial rate of rise.

BRIEF DESCRIPTION OF THE DRAWINGS

Other advantages of the invention will become apparent from the detailed description and drawings in which.

DETAILED DESCRIPTION

Figure 2:
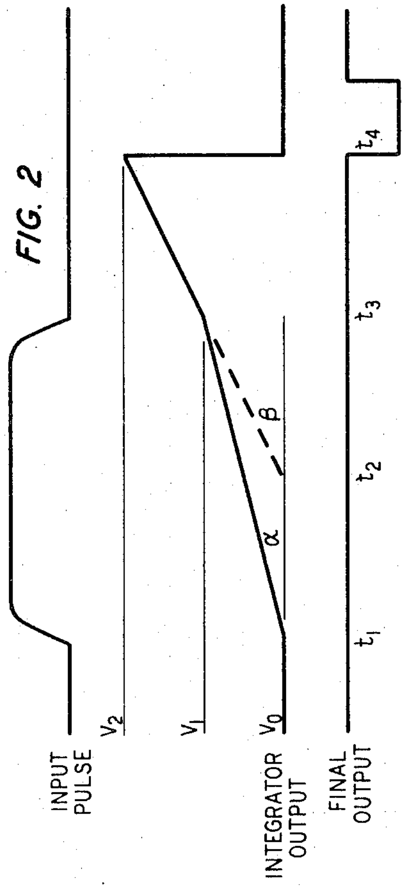
FIG. 2 is a waveform diagram useful in understanding the principles of the invention.

The present invention is based upon a principle illustrated by the waveforms shown in FIG. 2. A waveform designated integrator output in FIG. 2 rises during the presence of the input pulse waveform from a level $V_{00}$ a level $V_l$ at a rate of tan $\alpha$. At the end of the input pulse, the integrator output changes its rate of rise from tan $\alpha$ to tan $\beta$. When the waveform reaches a level of $V_2$ a final output pulse is generated. If the potential difference between $V_0$ and $V_2$ is a constant, the time between $t_2$ and $t_4$ will be a constant. By taking the ratio of the two succeeding slopes of the integrator output waveform (i.e., tan $\alpha$ and tan $\beta$), it can be shown that:

$$\frac{\tan \alpha}{\tan \beta}=\frac{t_3-t_2}{t_3-t_1}.$$

Therefore, $t_2$ will be situated a fixed percentage after completion of the input pulse. The time $t_4$, being a constant fixed time after $t_2$, will be a fixed time after a given percent completion of the input pulse. If tan $\beta$ is twice tan $\alpha$, $t_4$ will be a fixed time after the center of the input pulse.

It should be clear that a pulse cannot be generated directly at $t_2$. The dashed line in FIG. 2 has been projected back from the second sloped portion of the integrator output waveform to geometrically demonstrate the principle taught by this invention.

Figure 1:
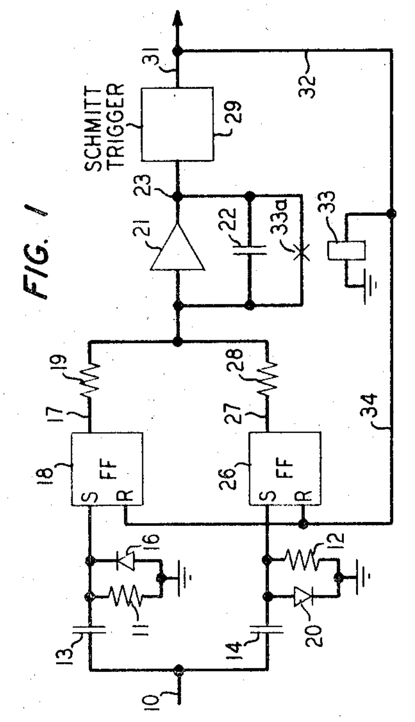
FIG. 1 is a functional block diagram of a system showing the principles of this invention.

These principles are employed in the system shown in block diagram form in FIG. 1. The input pulse (see the top line of FIG. 2) applied to a terminal 10, is differentiated by a pair of RC networks including resistors 11 and 12 and capacitors 13 and 14. A diode 16 connected across resistor 11 presents a high impedance to a positive spike resulting from differentiation of the leading edge of the input pulse. This positive spike sets flip-flop 18 to provide a voltage signal at an output terminal 17 thereof. A diode 20 limits the amplitude of the positive spike across resistor 12 and leaves flip-flop 26 undisturbed. The voltage at the terminal 17 is applied to resistor 19 which is part of an input circuit of an operational integrator which also includes high gain amplifier 21 and integrating capacitor 22. A ramp waveform (see integrator output FIG. 2) between times $t_1$ and $t_3$ is thus provided at the output terminal 23 of the amplifier 21. This output is the integral of the constant voltage applied to the resistor 19 at the terminal 17.

At time $t_3$ the trailing edge of the input pulse on terminal 10 is differentiated to provide a negative spike across resistors 11 and 12. The negative spike across resistor 11 is limited by the low forward impedance of diode 16, and has no effect on flip-flop 18. The negative spike across resistor 12 is offered a high reverse impedance by the diode 20. The spike appearing across resistor 12 and diode 20 therefore sets a flip-flop 26 to provide a voltage at an output terminal 27. This voltage is applied to resistor 28 which also forms part of the input circuit of the integrator. The current flowing in the resistor 28 adds to the current already flowing in the resistor 19, thereby increasing the rate of rise of the integrator output waveform. In this case, the voltages appearing at the terminals 17 and 27 are equal and the resistors 19 and 28 are equal so that the rate of rise of the integrator output is doubled by setting flip-flop 26. When the integrator output waveform on terminal 23 reaches a predetermined value as set by a Schmitt trigger 29, a final output pulse is provided on a terminal 31. This pulse is applied by a lead 32 to energize a relay 33 having a contact 33*a* which momentarily shorts out integrating capacitor 22 removing the charge thereon. The pulse is further applied by lead 34 to reset the flip-flops 18 and 26. Zero volts thus appear across resistors 19 and 28 so that no further integration occurs until another input pulse is applied to terminal 10. In situations where the input pulses are widely spaced, the contact 33*a* may be arranged to short capacitor 22 until the beginning of each input pulse so that error voltages are not integrated to provide appreciable signals.

Figure 3:
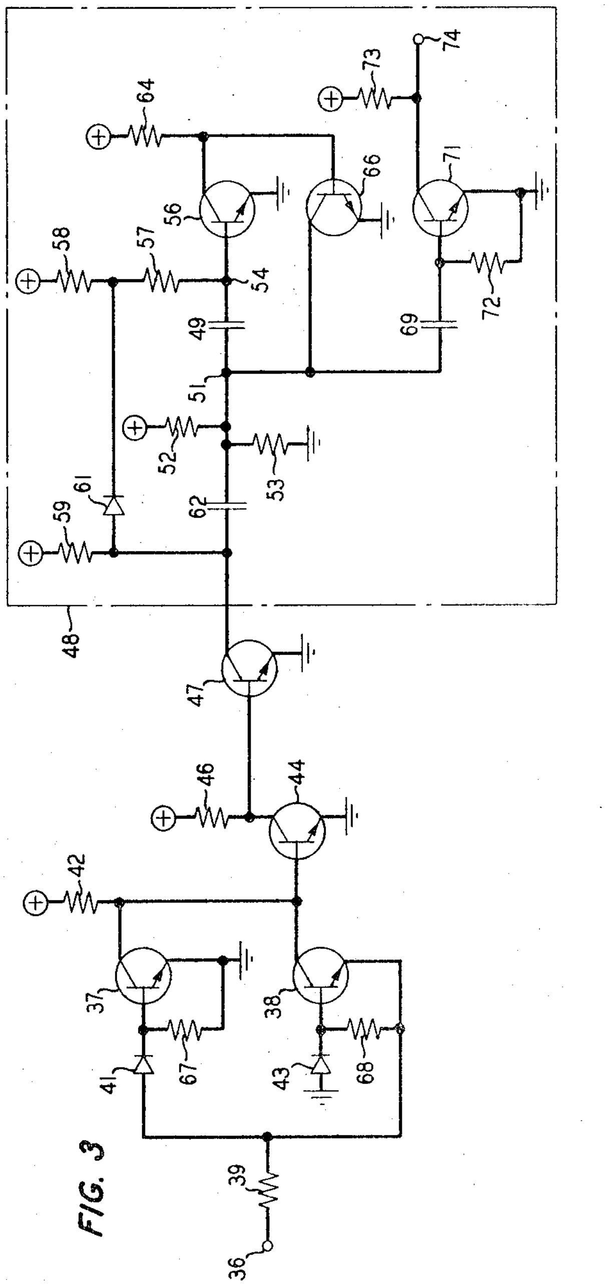
FIG. 3 is a circuit diagram of a circuit built in accordance with the principles of this invention.

A second system embodying the principles of this invention is shown in the schematic diagram of FIG. 3. An input pulse, such as the input pulse shown in FIG. 2, or a negative replica thereof, is applied to a terminal 36 to be rectified by a pulse rectifier illustratively including NPN transistors 37 and 38. A positive input pulse on terminal 36 will forward bias the base-emitter junction of transistor 37. Base current through resistor 39 and diode 41 will draw collector current through resistor 42 to saturate the transistor 37. The transistor 38 will be back biased by this positive pulse, thereby presenting a high impedance thereto. A negative pulse, on the other hand, will back bias the transistor 37 while forward biasing transistor 38. Current will be drawn from ground through diode 43, the base-emitter junction of transistor 38 and resistor 39. The resultant collector current through resistor 42 thereby saturates transistor 38. Therefore, it is seen that either a positive or a negative pulse applied to terminal 36 will cause the commonly connected collectors of transistors 37 and 38 to approach ground. This ground potential will cut off normally conducting transistor 44 and cause current flowing in its collector resistor 46 to actuate normally nonconducting transistor 47 to provide a negative gating signal to a timing circuit 48.

The timing circuit 48 includes a timing capacitor 49 having a first terminal 51 quiescently held at a potential determined by a voltage divider comprising resistors 52 and 53 connected between a point of positive potential and ground. Another terminal 54 of the timing capacitor 49 is held at a potential one diode drop above ground by a base-emitter junction of transistor 56, which is held in a normally conducting condition by current supplied through resistor 57 from resistor 58 in parallel with the series circuit formed by resistor 59 and normally conducting diode 61.

The negative gating signal applied to the timing circuit 48 brings the node formed by the junction of resistor 59 and diode 61 and capacitor 62 essentially to ground potential. The negative-going potential at the terminal 51 is coupled across capacitor 49 to bring the terminal 54 below ground. The transistor 56 is thereby cut off and current flow in its collector resistor 64 is transferred to the base of a transistor 66 to saturate it. The terminal 51 of capacitor 49 is thereby brought down essentially to ground. This second drop in potential at the terminal 51 of capacitor 49 is also coupled across to the terminal 54.

It is therefore seen that the terminal 51 of the capacitor 49 is now held at a low impedance point by the saturated collector of the transistor 66. The transistor 56 is reverse biased and offers a high impedance to the terminal 54 of capacitor 49 so that the rate of rise of voltage across the capacitor 49 is determined by the time constant of the capacitor 49 and the resistors 57 and 58. Voltage at the terminal 54 then increases at a rate determined by the resistors 57 and 58 until the input pulse at the terminal 36 is terminated.

When the input pulse is terminated, the terminal 36 is returned to ground and both transistors 37 and 38 are rendered nonconducting with the aid of resistors 67 and 68. The current in the resistor 42 is transferred to the base of transistor 44 and saturates it. The transistor 47 is cut off, thus removing the negative gating signal from the timing circuit 48. Removing this gating signal forward biases the diode 61 to provide current through resistor 59 to resistor 57. The current supplied to capacitor 49 over this new path thus alters the rate of rise of the potential at the terminal 54.

When the potential at the terminal 54 has increased sufficiently to render the transistor 56 conductive, the current flow in the base of transistor 66 is diverted to the collector of transistor 56 and transistor 66 is cut off. The voltage at the terminal 51 of capacitor 49 then increases at a rate determined by the time constant of resistor 52 and capacitor 49. Typically, the value of resistor 52 is substantially less than the combined impedances 57, 58, and 59 presented to the terminal 54 of the capacitor 49 so that the waveform at the terminal 54 resembles a slowing rise function while the waveform at the terminal 51 at the termination of the integration cycle rises relatively sharply. The positive rise of the terminal 51 is coupled through capacitor 69 to momentarily actuate transistor 71, which is normally held nonconducting by resistor 72. Current drawn through resistor 73 provides an output voltage pulse on the terminal 74.

It should be understood that the above-described arrangements are merely illustrative of the application of the principles of the invention. Numerous other arrangements may be devised by those skilled in the art without departing from the spirit and scope of the invention.

I claim:

1. In combination:

a voltage divider connected between first and second potential terminals, said voltage divider having a center terminal;

a first transistor;

a capacitor connected between the base of said first transistor and said center terminal;

a second transistor having a collector connected to said center terminal;

a first resistor having a first side connected to both the collector of said first transistor and the base of the second transistor;

a second resistor having a first side and a second side, said first side being connected to said base of said first transistor;

a third resistor having first and second sides, said second side being connected to said first potential terminal;

a first circuit element connected between said second side of said second resistor and said first side of said third resistor to form a first junction;

a second circuit element connected between said first junction and said center terminal; and a fourth resistor having a first side connected to said second side of said second resistor and a second side connected to said first potential terminal.

2. In combination with the combination as defined in claim 1 a pulse rectifying circuit for applying a gating pulse to said first side of said third resistor.